United States Patent [19]

Flynn et al.

[11] 3,831,765
[45] Aug. 27, 1974

[54] FILTER FRAME

[75] Inventors: Robert E. Flynn, Mascouche, Quebec; Gordon L. Price, Bath, Ontario, both of Canada

[73] Assignee: Domtar Limited, Montreal, Canada

[22] Filed: Sept. 18, 1972

[21] Appl. No.: 290,252

[30] Foreign Application Priority Data
Oct. 7, 1971 Canada............................ 124728/71

[52] U.S. Cl................ 210/484, 55/519, 55/DIG. 31
[51] Int. Cl........................................... B01d 27/08
[58] Field of Search.............. 55/518, 519, DIG. 31; 210/484, 486

[56] References Cited
UNITED STATES PATENTS
2,715,453  8/1955  Lange................................... 55/514
3,429,434  2/1969  Hickin........................... 55/DIG. 31

*Primary Examiner*—Charles N. Hart
*Assistant Examiner*—F. F. Calvetti
*Attorney, Agent, or Firm*—C. A. Rowley

[57] ABSTRACT

A filter frame is provided by a pair of retaining walls formed of corrugated material and provided with suitable apertures therein with the filter material trapped therebetween. The two frames are spaced by spacing walls which are integrally, foldably connected to at least one of the walls and are secured to the other wall to trap the filter material in place. The retaining walls extend at an angle to each other to prevent collapse of the frame.

5 Claims, 7 Drawing Figures

PATENTED AUG 27 1974　　　　　　　　　　　3,831,765

FILTER FRAME

FIELD OF THE INVENTION

The present invention relates to a frame, more specifically the present invention relates to a filter frame and a filter formed therewith.

DESCRIPTION OF THE PRIOR ART

It is common practice when manufacturing a filter, for example an air filter for use in a furnace or the like, to encircle the filter material with a frame-like structure that is generally U-shaped and is made by taping or the like. Many of the conventional filters have a pair of opposed retaining walls formed by thin metal plating having relatively large perforations through which the air passes. The filter material is received between these retaining walls and the bordering frame holds the retaining walls in spaced relationship while preventing the filter material from sliding out. Fabrication of filters is normally quite time consuming which contributes significantly to the over-all cost of such filters. Furthermore, the aesthetic value of such filters is relatively low and there is little space available for advertising or the like.

SUMMARY OF THE INVENTION

It is the main object of the present invention to provide a new retaining wall and frame structure for a filter.

Broadly, the present invention relates to a frame structure comprising a pair of retaining walls, apertures through said retaining walls to permit the flow of air, at least a pair of spacer walls, each of said spacer walls being integrally, foldably connected to one of said pair of retaining walls, means connecting each of said pair of spacer walls to the other of said retaining walls, said pair of spacer walls extending at an angle to each other.

BRIEF DESCRIPTION OF THE DRAWING

Further features, objects and advantages will be evident from the following description of preferred embodiments of the present invention taken in conjunction with the accompanying drawings in which.

DESCRIPTION OF THE PREFERRED EMBODIMENTS

The blanks of the present invention may be formed from any suitable material, however it is preferred to use corrugated cardboard as this provides adequate rigidity and yet is relatively economical.

Figure 1:
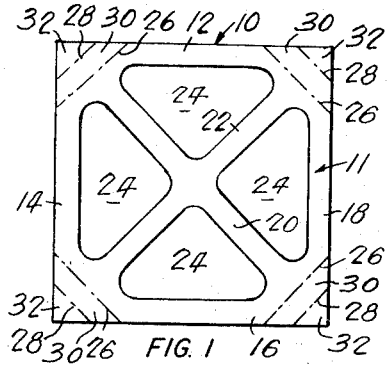
FIG. 1 is a plan view of a blank for forming one of the retaining walls and the spacer walls for one form of the invention.

The blank 10 of FIG. 1 for forming one of the retaining walls 11 is formed with border sections 12, 14, 16 and 18 interconnected by reinforcing bands or strips 20 and 22 which extend diagonally across the blank. The reinforcing wall 11, formed by the border sections 12, 14, 16 and 18 and the diatonal reinforcing strips 20 and 22, is quite strong and provides adequate area as indicated at 24 for passage of air through the frame.

In each of the corners, diagonal fold lines 26 and 28 foldably connect a spacer wall 30 to the main frame member and a retaining tab 32 to the spacer wall 30 respectively.

Figure 2:
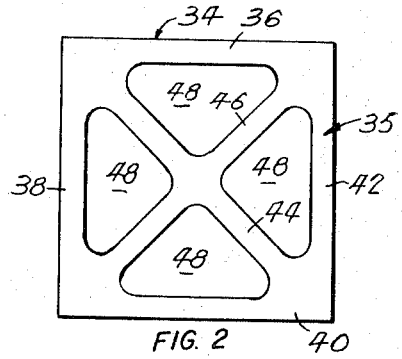
FIG. 2 shows the blank for forming a retainer wall for cooperation with the blank of FIG. 1.

The blank 34 of FIG. 2 forms the cooperating retaining wall 35 and is provided with border sections 36, 38, 40 and 42 together with diagonal reinforcing strips 44 and 46. Adequate open area is provided by the apertures 48 which are complementary in size to the apertures 24 in the blank 10. The apertures 24 and 48 will be substantially aligned in the finished product.

Figure 3:
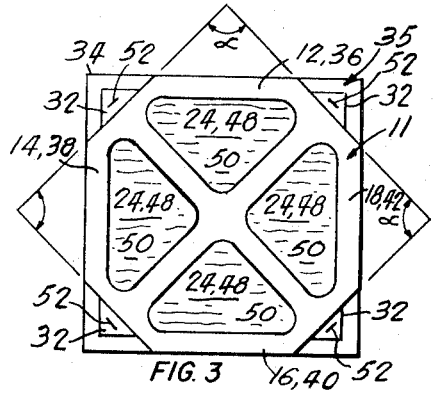
FIG. 3 is a plan view of a filter formed from the blanks of FIGS. 1 and 2.
Figure 4:
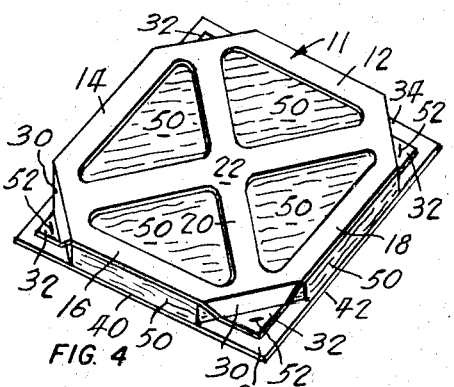
FIG. 4 is an isometric view of the filter of FIG. 3.

To fabricate a filter from the blanks of FIGS. 1 and 2, the simplest procedure is to lay a filter element over the blank 34 and then fold the blank 10 along fold lines 26 and 28 to arrange the spacer walls 30 perpendicularly to the plane of the retaining wall 11 and the tabs 32 substantially perpendicular to the spacer walls 30. The structure so formed is then moved down onto the filter material 50 positioned over the blank 34 and the retaining tabs 32 are stapled as indicated at 52, or otherwise secured to the blank 34 to trap the filter material 50 between the retaining walls 11 and 35. In the arrangement illustrated in FIGS. 3 and 4, the filter material is substantially the same shape as the retaining panel 11, i.e., it would have the corners cut off to accommodate the walls 30. It is also possible to simply use rectangular filter material 50 and to staple the tabs 32 to the blank 34 directly through the filter material. This latter structure requires that the filter material be crushed in the area of the tabs 32, however, since this area is blocked off by the blank 34 it would not significantly deter the air flow.

It is generally preferred to use two separate blanks as shown in FIGS. 1 and 2, as it is believed this facilitates the manufacture of the filter since the filter material can be laid on the blank 34 while the blank 10 is positioned thereabove and the walls 30 and tabs 32 moved into position so that the assembly step simply requires moving of the pre-folded blank 10 down onto the filter material 50 on the blank 34 and the stapling of the two blanks 10 and 34 together as above indicated. Such an operation may be substantially completely automated with a minimum of difficulty.

Figure 5:
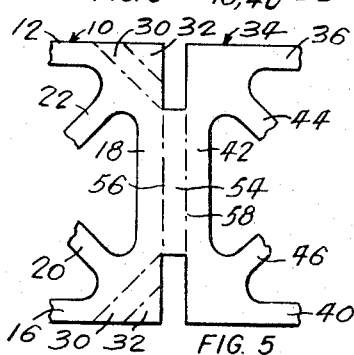
FIG. 5 shows a modification of the blanks of FIGS. 1 and 2.
Figure 6:
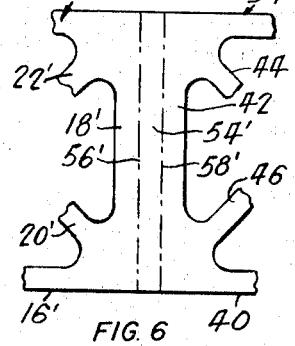
FIG. 6 shows a further modification of the blanks of FIGS. 1 and 2.

FIGS. 5 and 6 show modifications of the blanks of FIGS. 1 and 2 wherein the blanks are foldably interconnected by a connecting panel. These modifications simplify the blank formation but could make it more difficult to assemble the filter as it would be more difficult to fold the walls 30 into operative position.

The blank of FIG. 5 is composed of a blank substantially indentical to the blank 10 connected to a blank substantially identical to the blank 34 by means of a connecting wall 54 which is foldably connected to the blanks 10 and 34 by fold lines 56 and 58 respectively. With this arrangement the blanks 10 and 34 are moved into opposed parallel relationship by folding about the lines 56 and 58 that are spaced by the height of the panel 54 which is substantially equal in height to the spacer walls 30 to provide for proper separation of the two retaining walls 11 and 35.

In the FIG. 6 embodiment, a blank 10' which is essentially the same as the blank 10 with the exception that the fold lines 26 and 28 and the panels 30 and tabs or flaps 32 have been omitted from the right-hand side of the blank, i.e., the side of the blank adjacent blank 34. The blanks 10' and 34 are interconnected by a connecting wall 54' which extends the full length of the blanks 10' and 34 and which is foldably connected to the blanks 10' and 34 respectively by fold lines 56' and 58'. This blank is assembled to form the filter in essentially the same manner as the blank of FIG. 5.

Figure 7:
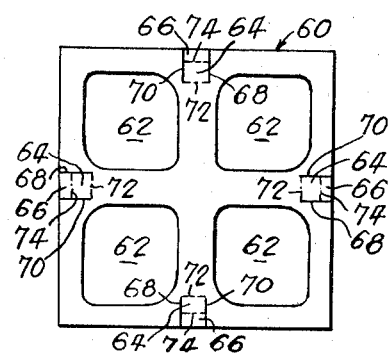
FIG. 7 shows a modification of the blank of FIG. 1.

FIG. 7 shows a modified blank 60 for forming one of the retaining walls and the spacer walls of the filter. This blank is adapted to cooperate with a blank of similar configuration but not having spacer walls and tabs formed therein.

As shown, the blank 60 is provided with apertures 62 for the traverse of air and has spacer panels 64 and retaining tabs 66 formed therein by lines of severance 68 and 70 and fold lines 72 and 74. Fold lines 72 foldably connect the panels 64 to the retaining wall formed by the blank 60 while the fold lines 74 connect the tabs 66 to the panels 64. The walls 64 and tabs 66 function in the same manner as the walls 30 and tabs 32 with the tabs 66 being adapted to be secured by stapling or the like to the border sections of the complementary retaining wall. This structure is not as strong as the structure provided by the other embodiments.

In the illustrated embodiments, the spacer walls have been shown as being provided on one blank only, however, if desired some of these walls may be removed from the blank 10 and provided on the blank 34. The number of these spacing walls has been shown as one in each corner, or four, in the rectangular blanks shown in FIGS. 1 to 5, however in the FIG. 6 arrangement only two such spacer walls together with a connector wall have been utilized. It is important that all of the spacer walls not be parallel to one another since this would permit collapse by folding along the fold line connections between the retaining walls of their connecting tabs. In the FIG. 3 arrangement the spacer walls have been shown as extending at angles α to one another, this angle in the embodiment illustrated is 90°, but obviously could be any suitable angle.

If desired, the spacer walls such as the walls 30 or 64 could extend completely about the periphery of the filter, however, in such circumstances much more board would be used and very little would be gained except that the end walls of the resultant filter would be closed.

In each of the illustrated arrangements, the spacer walls connected to one of the blanks extend the full distance between the two opposed retaining walls formed by the blanks, however, it is possible to put partial spacer walls on each of the blanks and connect these partial spacer walls together; however, this complicates the fabrication and attains little if any advantage except for very special circumstances.

Further modifications will be evident to those skilled in the art without departing from the spirit of the invention as defined in the appended claims.

We claim:

1. A filter frame comprising a pair of substantially parallel polygonal retaining walls, apertures through said retaining walls to permit air flow therethrough a filter element, a plurality of spacer walls, at least a pair of said spacer walls, a fold line integrally foldably connecting each of said spacer walls to one of said pair of retaining walls, each said fold line extending diagonally across a corner of said one wall, a securing tab integrally foldably interconnected to each of said spacer walls and lying in a plane parallel to and adjacent the other of said pair of retaining walls said tabs extending outwardly from said spacer walls relative to said one of said pair of retainer walls, and means connecting said tabs to said other wall.

2. A filter frame as defined in claim 1 wherein said retaining walls are rectangular and one of said spacer walls is positioned in each corner of at least a pair of adjacent corners of said one retaining wall and each said fold line extends at substantially 90° to said fold lines in said adjacent of said corners.

3. A filter frame as defined in claim 1 wherein said retaining walls are rectangular and are provided with a peripheral border section interconnected by a pair of diagonally extending mutually perpendicular strips which together with said border section define said apertures.

4. A filter frame as defined in claim 2 wherein said retaining walls are provided with a peripheral border section interconnected by a pair of diagonally extending mutually perpendicular strips which together with said border section define said apertures.

5. A filter frame as defined in claim 2 wherein said retaining walls are interconnected by a connecting wall foldably, integrally connected to said retainer walls by a pair of spaced, parallel fold lines, said spacer walls being located at the end of said frame remote from said connecting wall.

* * * * *